(12) United States Patent
Johnson et al.

(10) Patent No.: US 6,554,188 B1
(45) Date of Patent: Apr. 29, 2003

(54) TERMINAL FOR AN ACTIVE LABELLING SYSTEM

(75) Inventors: Colin Francis Johnson, Taumaranui (NZ); Owen Richard St George, Taumaranui (NZ); Murray Greenman, Papakura (NZ); Gordon Douglas Irving, Auckland (NZ); Christopher Lee Sommerville, Auckland (NZ)

(73) Assignee: Electronic Data Holdings Limited, Auckland (NZ)

( * ) Notice: Subject to any disclaimer, the term of this patent is extended or adjusted under 35 U.S.C. 154(b) by 0 days.

(21) Appl. No.: 09/958,810

(22) PCT Filed: Apr. 13, 2000

(86) PCT No.: PCT/NZ00/00051
§ 371 (c)(1),
(2), (4) Date: Oct. 15, 2001

(87) PCT Pub. No.: WO00/62263
PCT Pub. Date: Oct. 19, 2000

(30) Foreign Application Priority Data

Apr. 13, 1999 (NZ) .................................................. 335173
Feb. 10, 2000 (NZ) .................................................. 502791

(51) Int. Cl.⁷ .............................................. G06F 17/60
(52) U.S. Cl. ................... 235/385; 235/375; 340/572.1; 340/572.2; 340/572.3
(58) Field of Search ................................. 235/375, 385

(56) References Cited

U.S. PATENT DOCUMENTS

| | | | | |
|---|---|---|---|---|
| 4,617,876 A | * | 10/1986 | Hayes | .......................... 119/155 |
| 4,707,781 A | * | 11/1987 | Sullivan et al. | ............. 364/200 |
| 5,214,409 A | * | 5/1993 | Beigel | .......................... 340/572 |
| 5,499,626 A | * | 3/1996 | Willham et al. | ............. 128/630 |
| 5,719,938 A | * | 2/1998 | Haas et al. | ..................... 380/21 |
| 5,936,527 A | * | 8/1999 | Isaacman et al. | ......... 340/572.1 |
| 6,012,415 A | * | 1/2000 | Linseth | ......................... 119/174 |
| 6,131,090 A | * | 10/2000 | Basso, Jr. et al. | .............. 706/23 |
| 6,342,839 B1 | * | 1/2002 | Curkendall et al. | ...... 340/573.3 |

FOREIGN PATENT DOCUMENTS

| | | |
|---|---|---|
| EP | 0 307 335 | 3/1989 |
| EP | 0 755 026 | 1/1997 |
| WO | WO97/22092 | 6/1997 |

* cited by examiner

Primary Examiner—Karl D. Frech
Assistant Examiner—Daniel A. Hess
(74) Attorney, Agent, or Firm—Young & Thompson

(57) ABSTRACT

This invention is for a reader/writer device (terminal) for accessing item-related data in rewritable tags of the "RF-ID" type wherein each tag includes non-volatile memory. In a farm animal application each animal is implanted with an identified tag. From time to time, the terminal can be given a selected security level by reading password-like and individual identity data from a special tag held by an individual. As a result the individual can gain "read" and/or "write" to selected fields in the data record held within the tag. Further information may be added from time to time by empowered individuals. Schemes are enabled for the enhanced management of animals having such tags include accurate descriptors, proving ownership, showing compliance with disease control programmes and withholding periods after possible treatments, traceability of meat products from the shop to the farm, breeding schemes and performance recording. The use of security levels and the traceability of entries adds to the reliability of the stored information.

14 Claims, 4 Drawing Sheets

(main menu)

| Read Key Tag | |
|---|---|
| | Read |
| | Weight |
| | Treatment |
| | Disease |
| | Vaccination |
| | COnfigure |

| DISEASE | |
|---|---|
| Tag No: | AB1267 |
| TB status | +ve |
| TB Data | 17:01:00 |
| EBL status: | -ve |
| EBL data | 00:00:00 |
| Johnes status | -ve |
| Johnes data | 00:00:00 |
| Read | Write |

WEIGHT

Tag No.
Sex:
Breed:
Last Weigh Date
Last Weight:
Weight         270
Date:          17:01:00

Read          Write

VACCINATION

Date given:
Tag no.
Lepto booster        12:11:99
BVD booster          20:12:99
IBR booster          12:11:99
Clostridial booster  12:05:99

Read          Write

Fig 5

TERMINAL FOR AN ACTIVE LABELLING SYSTEM

TECHNICAL FIELD

This invention relates to provision of active labels comprising implantable or attachable identification means on items or commodities; to remote, non-contact and/or non-optical reading of and writing to the identification means itself and in particular to a terminal for interrogating transponders of an active radio-frequency identification systems for items.

BACKGROUND ART

In many processes and systems, a group of distinct items will require to be separately identified. Examples of groups of items include the shopping in a supermarket trolley, luggage at an airport, files in an office, or animals on a farm, the initial application of this invention. Existing means for identification include simple recognition, written or printed labels, colour coding, bar coding, and the like.

There is an increasing need to provide an account of the history of an item, such as a food animal, from birth right through to the point of retail sale in order to satisfy requirements such as those relating to welfare considerations, or health concerns such as antibiotic residues. One way to provide the last might be by recording all the significant events, such as vaccinations or veterinary treatments, that have happened to that, animal through its lifetime. Furthermore, herd improvement strategies can be based on detailed freezing-works reports correlated with sire identification. While these events could be recorded externally such as on a paper record, there are a number of administrative advantages in having the individual record actually carried with the item in question. (For example the immediate problem to be solved might be to ascertain the previously recorded weight of a heifer, when in a cattleyard miles from the nearest telephone and computer). In the case of an animal, this could be in the form of a plastic tag such as an eartag having a number of positions capable of being clipped (like a bus ticket) whenever something is to be recorded, but it is clear that disadvantages of this would include (a) the limited number of separate records, and (b) the propensity of eartags to be lost.

The use of a central database relating prior-art "electronic eartags" which are simply provided with a unique, electronically readable number at the time of manufacture and lack an ability to receive and hold information during their life has been proposed. The management of such records provides an administrative problem, given that events impinging on an animal from time to time, or at any time, would have to be transferred accurately into a central database. In contrast, being able to characterise a farm animal immediately and unambiguously would be advantageous. It would be useful if any proposed labelling system could work in the absence of a computer.

In order to assist in the storage of reliable information, it would seem desirable to limit access by various would-be users as far as possible, so that for example a veterinarian could read and write memory elements (fields in a record) relating to health status and medical/treatment matters, a stock agent could read only ownership and health status matters. An owner might have wider powers although his staff might only be permitted to read from specific fields. Furthermore, physically (as opposed to by-machine) reading the record as carried on the item (animal suitcase, package or the like) may require undue mental and physical agility. Thus the problem to be solved might be described as "the need to provide a verifiable, immediately readable, rewritable data storage device capable of being placed relatively permanently on a moveable object. Furthermore, an ability to control who can read or write to any specific record seems to be desirable".

Previous attempts to solve the problem in general (meaning the use of RF-ID tags on animals) include a number of industry-initiated electronic ear tag ventures involving Philips, Motorola, Texas Instruments, and others. None have been notably successful apart from the passive microchips widely used on pet animals.

Patent documents which relate closely to the present invention include:

U.S. Pat. No 5,499,626 to Willham et al (filed June 1994) describes an implantable programmable electronic data tag, and a scheme for using an individual mammal as its own mobile record capable of receiving changeable information. The document is useful for providing a guide for a livestock record system. A central database is assumed for breed performance averaging (bioeconomic values); details of which are described. The data tag is assumed to be battery-driven.

Avid Corp: U.S. Pat. No. 5,214,409 inventor Beigel M, Avid Corp: U.S. Pat. No. 5,257,001 Beigel M, and Avid Corp: U.S. Pat. No. 5,499,017 Beigel M all relate to a terminal, and an RFID tag having 3 kinds of memory in the tag namely R/O (ROM), R/W (EEPROM), and temporary (RAM) memories (the last for use with tag sensors). A single level of security is provided for.

Magtronic: U.S. Pat. No. 6,012,415 inventor Linseth describes an RFID tag for the first (rumen) and second (reticulum) stomachs of cattle, combined with a heavy magnet also useful for the minimisation of "hardware disease" and a plurality of read or write memories.

Venda Corporation (WO97/22092) and other specifications commencing with Watanabe (U.S. Pat. No. 4,709,136) describe a physical device providing a form of security for confidential data upon a smart card or the like, in which simultaneous access of the smart card together with a second smart card containing enabling information such as a password is required. Hardware capable of reading two smart cards at the same time is used.

DEFINITIONS

"Active" relates to the ability of information carried within an identification means—as will be described herein—to be altered from time to time (implying a rewritable memory capability), or, it relates to the capability of the identification means to respond to an interrogation with a selected stream of information. (A passive tag is one carrying unalterable information only: whether directly viewable or in electronically readable form).

"Animal" includes living items having an intrinsic importance; including mammals (not excluding humans), birds, reptiles, and fish, and includes plants, trees, or portions thereof.

"Terminal" refers to a device capable of supplying wireless energy to a transponder, and capable of reading data from, or writing data to, a transponder so powered.

"Transponder" refers to a device which responds to an interrogation by returning information, such as identification. In the instances generally under consideration, it also refers to RFD transponders powered by collection and conversion of at least some of the energy within the interrogation signal.

"RF-ID" refers to radio-frequency powered identification label units, functioning as transponders.

OBJECT

It is an object of this invention to provide improvements in apparatus and methods for a radio-frequency identification tagging system, or at least to provide the public with a useful choice.

DISCLOSURE OF INVENTION

In a first broad aspect, the invention provides a terminal for an active labelling system employing wireless-powered identification tags, including: data processing means, program control means, data storage means and optionally a display and user control means; the terminal having wireless communication means capable of reading from and of writing to a wireless-powered identification tag; the tag including tag data storage means capable of storing more than one field of data within a record, wherein the terminal is capable of acquiring data comprising a code sequence from an unprotected area of data storage within a first or "key" type of wireless-powered identification tag, and if at least a part of the code sequence is recognised by the terminal as belonging to a set of predetermined security key sequences, of then adopting a security rank selected in accordance with the key sequence from a range of predetermined security ranks; the adopted security rank empowering the terminal to become capable of effective access to a predetermined set of one or more protected fields of data within a second or "tag" type of wireless-powered identification tag, so that the same terminal may serve different users at different times under different security ranks.

Preferably at least one security rank permits only read access to a predetermined set of one or more protected fields of data within the second type of wireless-powered identification tag.

Optionally, at least one security rank permits only write access to a predetermined set of one or more protected fields of data within the second type of wireless-powered identification tag.

More preferably, higher security rankings allow access to a greater number of fields.

In a related aspect, at least one security rank permits write and read access to a predetermined set of one or more protected fields of data within the second type of wireless-powered identification tag.

In a second related aspect, the invention provides a "key" for making a security rank available to a terminal as previously described in this section, wherein the key comprises a wireless-powered identification tag having tag data storage means capable of holding a fixed set of data including a predetermined security key sequence in a field always readable by the portable terminal, so that the security rank of the terminal may be altered at any time.

Preferably the key further holds a computed code sequence capable of uniquely identifying the key.

In a third related aspect, the invention provides that the terminal has been hard-wired or programmed so as to retain a security rank, once adopted, for a limited maximum period.

A preferred example period is eight hours.

In a second broad aspect the invention provides a terminal as previously described in this section, wherein the portable terminal is provided with means capable from time to time of encrypting the data to be deposited within the tag data storage means, and with means capable of decrypting previously encrypted data retrieved from the tag data storage means, so that at least some fields of data stored within the tag are relatively inaccessible to terminals lacking an effective decryption means.

Preferably the encryption means includes a process for placing the data within the tag data storage means in a non-predictable manner.

In a related aspect, the security rank in functional combination with instructions within the terminal provides that at least one field stored within the tag data storage means is capable of being written to only once, and is capable of being read from many times, so that the at least one field serves as unalterable memory, or write-once memory.

In a further related aspect the security rank in functional combination with instructions within the terminal provides that at least one field stored within the tag data storage means is capable of being written to many times, and is capable of being read from many times so that the at least one field serves as alterable memory, or write-many memory.

In a third broad aspect the invention provides a terminal as previously described in this section, wherein the terminal is further provided with interface means capable of facilitating the movement of data to or from at least one information-handling device according to an Applications Programming Interface (API) so that the terminal can send and/or receive data between the terminal and the device and thereby effectively interact with the device.

Preferably a set of instructions for making use of the Applications Programming Interface is published.

In a fourth broad aspect the invention provides a terminal as previously described in this section, wherein the terminal is provided with a protocol comprising a predetermined allocation of one or more fields of data, each field having a predetermined data type, a predetermined protection status in relation to a given security rank, and a predetermined alterability status, to be used in conjunction with a second or "tag" type of wireless-powered identification tag capable of being attached to one of a set of items: under which protocol the item is capable of serving as its own data carrier.

Preferably the protocol is developed for use with an animal.

More preferably the protocol provides for the storage of a record of information including one or more of the following fields:

identification of the wireless-powered identification tag itself, identification of the animal, the date of birth of the animal, identification of the sire and/or the dam of the animal, the birthplace of the animal the original owner of the animal, the current owner of the animal, the health status of the animal, any disease control measures imposed upon the animal, any treatments delivered to the animal, any withholding periods as a result of any treatments that are liable to result in unacceptable residues being present within the body of the animal during the withholding periods performance factors such as fertility, weight gains during known periods, wool growth, or stamina.

In a fifth broad aspect the invention provides a hand-held terminal.

Alternatively the terminal may be attached to a site adjacent to an expected route traversed by one or more items each capable of carrying a wireless identification tag.

In a sixth broad aspect this invention provides an active wireless identification system for an item, wherein at least one remotely readable and remotely writable attached identification means is applied to the item for an extended period and a transceiver means (or terminal) is employed, from time to time, to provide power to, read identification information from, and write to the identification means; the identification means being capable of (1) repeatedly taking in, (2) storing, for an extended period, and (3) repeatedly returning identification information so that each item may be identified over a distance to the transceiver by "reading" —in a machine-reading sense—some or all of the information held within the identification means, and in turn the transceiver is capable of translating the information into a form suitable for use by a human operator.

Preferably the identification information is held in the form of digital data laid out according to a predetermined format, and optionally the digital data is at least partially encrypted and/or compressed according to a predetermined storage algorithm.

Preferably, though by no means exclusively, the item is a farmed animal or the like, and the group comprises a herd or flock of similar animals.

In a related aspect this invention provides an active wireless identification-system for individual identification of a farm animal or parts thereof, wherein the identification means is capable of storing (1) unique identification data within a permanent memory, (2) storing further data within a permanent memory, and (3) storing yet further data within an over-writable memory.

In another related aspect this invention provides an active wireless identification system for individual identification of a farm animal or parts thereof, wherein the identification means is capable of withholding, and thereby inhibiting the reading of, at least a predetermined portion of the data held within any memory unless a recognized password has been transmitted to the identification means from the transceiver means as by a "key" as previously described in this section.

Preferably further information is capable of being inserted into the identification module from time to time by means of a transceiver so that the identification module may be used as an "on-board event logging means" and so that the significant events in the history of the item can be read out from time to time, in physical association with the item itself.

In a yet further broad aspect the invention provides apparatus for implanting an implantable identification means in a subcutaneous location (such as behind one ear of an animal).

Preferably verification means capable of showing that the implanted identification means is functioning after insertion is included.

Preferably means to download a record of implanted identification means to a data processor is provided.

Optionally, means to subsequently communicate with implanted identification means for the purpose of adding information or reading back information may be provided separately.

In an alternative aspect the item is an object to be transported from a source to at least one destination, and the group comprises an aggregation of objects sharing a common source.

Optional "single transportable object events" include ownership, nature and/or class of contents, carrier identification, value of contents, transhipment records, Customs clearance, and delivery receipts.

Example single transportable objects include luggage, courier packs, wool packs, and letters.

Preferably the distinctive identification common to the group is allocated by an external supervisory agency.

Optionally the means for depositing the distinctive identification employs an encryption algorithm to securely confirm the distinctive identification. Preferably the algorithm is based on the "public key" encryption algorithm.

Preferably a systematic allocation of information to be stored within the identification module employs a predetermined protocol so that an identity once established cannot be changed but a log of events may be overwritten.

Optionally at least some of the information is held in an encoded form and preferably this encoded form provides an increased density of information packing within the identification means.

Preferably the information stored within any one identification means follows the same layout as for any other, so that a wide-area standard exists and items arriving at a location from a plurality of other locations may be identified and characterised regardless, and so that a given terminal (reading device) is more widely usable.

Optionally at least some of the information may be stored externally with reference to a sufficiently unique identification carried within the identification means.

Optionally this externally stored information may be a copy of information stored within the identification means, or optionally additional information may be stored externally, such as repeated weight gains, or shipping information.

Preferably means are provided to return at least some of the information recovered from the identification module at the end of the life of an item bearing the identification module to the originator of the item, so that the originator is made aware of selected information, optionally including extra information.

Preferably in the case of an animal destined for a meat processing works the extra information includes information relating to carcass weight, meat quality, and the like.

In a further related aspect this invention provides a method for the copying or cloning of at least a portion of the information held within an identification means into an optionally replicated second type of identification means, so that any part of a farm animal may be identified as to its origins.

Preferably the second type of identification means is machine-readable, though optionally at least a part of the second type bears plain text capable of being read directly by a person.

Optionally the second type of identification means is retained as far at the point of retail sale of the part of the farm animal.

An example embodiment is an animal tag having means for attachment to an appropriate part of an animal, a surface capable of bearing indicia, and an optionally internal surface capable of supporting the identification means and aerial means.

Another example embodiment is a package tag having means for attachment to an appropriate part of an item, a surface capable of bearing indicia, and an optionally internal surface capable of supporting the identification means and aerial means.

A further example embodiment of the identification means comprises an implantable object, capable of being inserted into and remaining within an item to be identified; the object being provided with means configured in a manner capable of interaction with an electromagnetic field.

For one preferred implantable identification means suitable for use in livestock identification, the implantable object comprises a biologically inert coating extending over an active device including receiver means, internal power supply means, storage means, and transmitter means.

Optionally the biologically inert coating may include an ingredient capable of reducing any local infection resulting from the act of insertion of the identification means.

Optionally the biologically inert coating may include an ingredient capable of forming physical links with adjacent tissues so that the identification means becomes held in place.

BRIEF DESCRIPTION OF DRAWINGS

FIG. 5: Example display screens for an animal identification system.

BEST MODE FOR CARRYING OUT THE INVENTION

Figure 1:
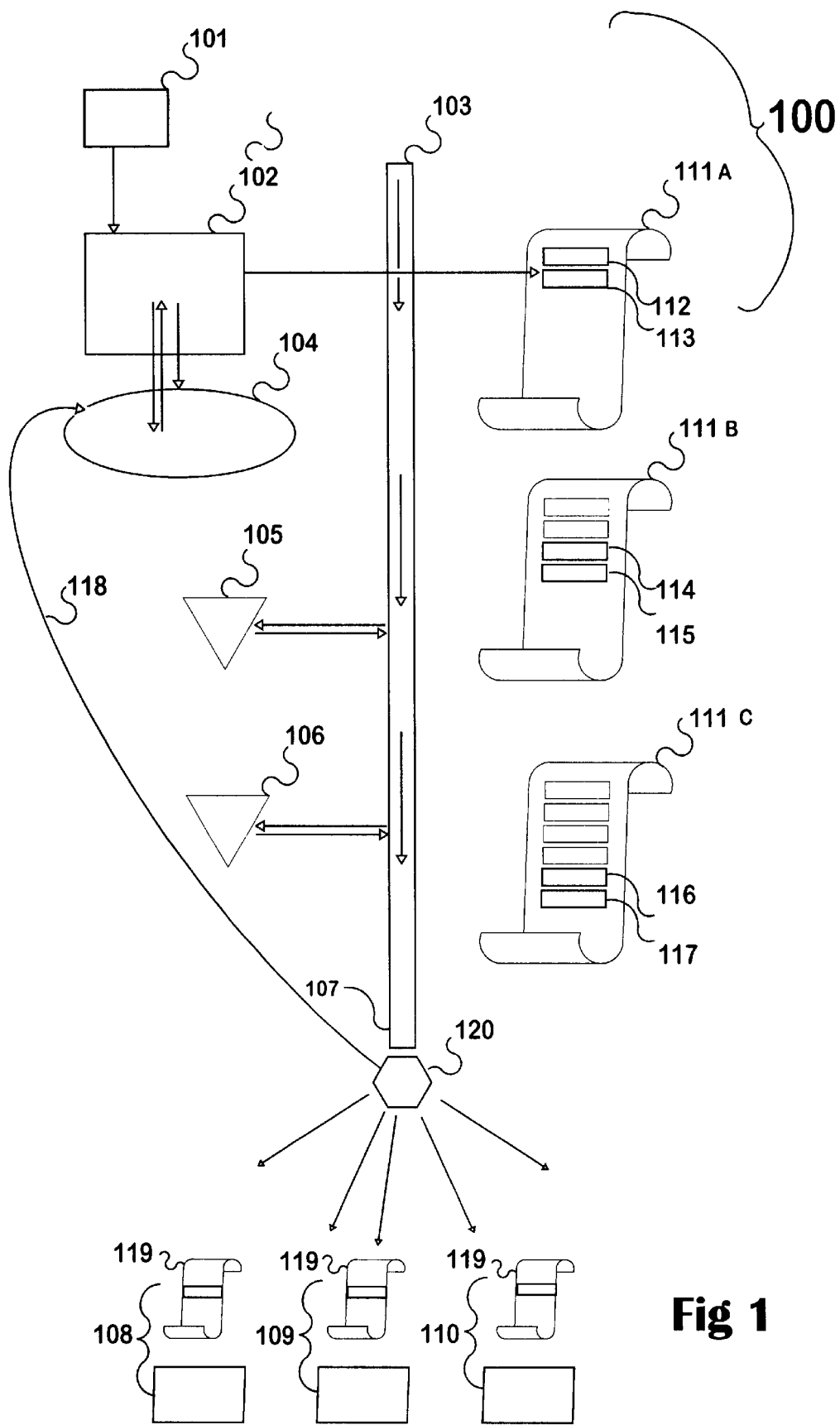
FIG. 1: Block diagram of information flow, through the life of an animal.

The description of the invention to be provided herein is provided and illustrated as examples and the specification is not to be taken in any way as limiting the scope or extent of the invention.

In principle, this invention provides an identification system for a group of moveable items such as selected articles in a supermarket trolley, a pile of luggage at an airport, files in an office, or in particular, individual animals on a farm. According to this invention, each item is provided with a remotely readable and remotely writable attached identification means and generally these employ radio-frequency identification ("RF-ID") techniques. The invention is more than a passive "licence-plate"; it has the capability of gaining further information during the life of the item. Each identification means is further capable of holding further identification and optional event logging for an extended period perhaps of ten years, using silicon-level techniques such as "flash memory".

Each item may from time to time be identified by wireless means over a useful distance to receiving terminal, to reveal or all of the held information. The terminal supplies energy to the RF-ID tag thereby activating the internal electronics. In some situations, a close-range reader may be used to get the details from a selected single item. In other situations, a group of items may be handled as a group and each separate identification means and hence each item may be recognised by (for example) having a random delay response time so that they do not reply simultaneously (as for the supermarket trolley application), or selected ones or groups may be commanded to respond by means of an appropriate protocol in the transmitted information (as for the finding a file within an office).

Within each identification means, preferably at least some of the information is held in a tamper-proof "write-once" storage means so that subsequent reading out can be certain of at least some facts, such as a basic identifier. "Certainty" can be further enhanced with certain cryptography algorithms as well as by control of security—as access rights. For example, public key algorithms allow one to verify the identity of the sender of a message and an analogous use is in verifying the identity of the inserter of at least some of the information. (The algorithm need not be implemented in the RF-ID tag or identification module; that is analogous to the an encrypted message). Because in practice only a finite space is available for storage of information, some of the information may be held in a "repeatedly writable" storage means. The latest information overlies earlier information relating to the same thing, such as the last port of transhipment, the latest weight gain, or the last veterinary treatment. In a large storage space, all information could be "write-once" Some information may not be readable without some form of password.

Optionally at least some of the information is held in an encoded form, preferably providing an increased density of information packing within the identification means. Indeed, encoding may also provide for an inbuilt checksum in order to verify data integrity because bits may be corrupted during storage, or a low signal to noise ratio (or interference) during writing or reading may affect information transfer. (A data processor should include procedures to alert an operator in the event of inconsistent data).

Preferably any unit of information to be held can be allocated a write-once or a write-many address within storage means internal to the identification means, as appropriate, according to a predetermined protocol so that an identity once established cannot be changed but a log of events may be overwritten. The use of (for example) security bits to prevent subsequent access to write control of portions of a memory array is well known in this art. The proportion of the total memory structure that is under the control of security bits can be determined with a mask during integrated circuit manufacture.

Preferably the information stored within any one identification means follows the same layout as for any other within a class of groups, so that a wide-area standard exists and items arriving at one location from a plurality of other locations may be treated in the same way. In other words, a common language is preferred.

At least some of the information may be stored externally, such as within a data processor, with reference to a sufficiently unique identification carried within the identification means.

Application 1—Livestock

One example need, particularly with beef in relation to European consumers, to provide assurances in relation to country of origin, antibiotic residues, freedom from disease, age, and so on for any individual package of meat on sale. In the absence of a categorical assurance, many customers will assume that the meat is liable to include BSE or radioactive materials, genetically modified material, or other toxic residues. A New Zealand source can comprise a price advantage. The rising importance of the "organically grown" label means that such an identification system is becoming essential to satisfy the needs of that market. A field of data reflecting the organically-grown status, the genetically modified status, or the health status of the item labelled is a useful identifier.

Another need is to provide better feedback of meat works results such as body weight, carcass composition, fat, or defects to an animal's owners (or to its breeders) so that herd improvement can be carried out. For example, an individual farmer may be returned numerical information which on analysis returns a statistically valid result (particularly if the progeny of more than one sire is included in the animals to be killed) that one sire is better than another sire. The statistics can be read in a more precise manner when the sire has been used on a number of individual farms, or over a number of seasons. Farm management practices may be improved in a similar way. Professor Willham's patent, U.S. Pat. No. 5,499,626 teaches such aspects.

Another list of specific applications is: birth statistics, growth statistics, fed management, livestock improvement, breeding lineage (pedigree), treatment data, bovine tuberculosis control, deer tuberculosis control other animal health programmes (brucellosis, leptosirosis, etc), livestock breeding improvement programmes, and European Union animal monitoring requirements.

Refer to FIG. 1, which relates the application of an active labelling system to the life of a meat animal. Here, box 103 represents the life of the animal, from birth (at 103) to death (107) at an abattoir. The use of this invention in relation to a meat animal includes the following example steps. . .

Figure 2:
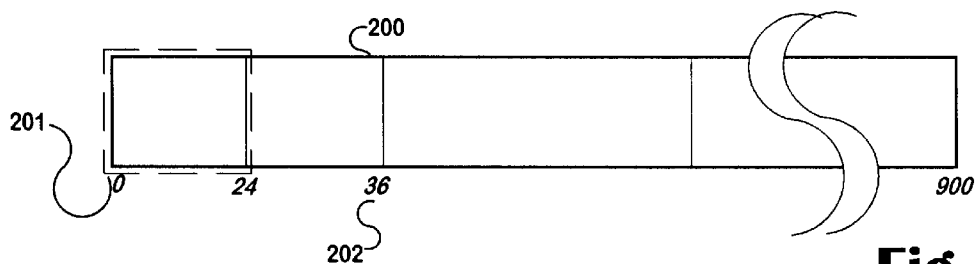
FIG. 2: Memory map of an RF-ID chip

1. There is a widely adopted standard for using apparatus capable of presenting a consistent array of information to a data processor, so that, regardless of actual chips, the system is capable of universal application. In on practical example, implanting means (gun) identifiers use up bits 0–15 (write-once). FIG. 2 shows a memory map 200; from bits (indicated at 202) from 0 to 900. Some bits (201) are in a write-once section. Individual identifiers use up the next set of bits. Date of birth uses 12 bits (write-once). Some other snippets of information may be required to be write-once, such as national animal health programmes including for example tuberculosis test results. Other information may be stored on reusable parts of memory. Sire and dam identification, weight gain rates, drenching records are examples. Of more interest is that whenever a food animal is treated with a systemic antibiotic, this fact should be recorded and the retaining period (the duration of time during which the risk of an unsafe residue of the material being found in the food product) shall be included. In the event of multiple retaining periods being in effect, the longest period is the one to be retained.

2. A farm, or perhaps a person who contracts to a number of farms as an "Implanter", possesses an implanting means 102 capable of implanting RFID devices always including distinctive identification 112 that has been allocated by an external supervisory agency 101. This is intended to avoid confusion between different items that may come to have the same identifier, such as "1". A national database of data then simply relates a given implanting means to an identified operator. An implanting means 600 comes with suitable electronics 601, 602 for writing information into a tag 603, optionally blowing security bits, or for reading information from a tag and it may be that no other form of transceiver is required. Noting that such devices are often trampled into the mud in a stock race, there is a requirement to make at least the data storage element resistant to environmental influences. Solid-state storage devices are preferable and even more preferable is the ability to store in the absence of power. A data processor such as a computer may be provided with each implanting gun although it may be more convenient to place most of the data processing capability at a remote site and maintain only a bare minimum of processor capability (such as an on-board microprocessor and some "flash memory") in or near the implanting means itself. Each identification means used within a group is usually at least partially encoded at the time of joining with each corresponding item, so that the item gains some preferably permanent identification at this time. One way to impose this identification is by means of a transmitter device included within an implanting (applicator) means capable of adding a distinctive identification common to the group. A kind of implanting means that we are contemplating for use resembles a hormone implanting gun and is adapted to insert an implant physically similar to a hormone implant subcutaneously, such as in the back of an ear and preferably always on the same side so that a reading action can be better directed. Hormone implants are reasonably widely used and tend not to migrate nor to be lost altogether before the insertion hole has sealed itself over with a scab.

3. An animal 103 is preferably treated to an implant reasonably early in life, so that its date of birth, its sire and its dam can be recorded on a record 111A as 113.

4. Whenever a significant event occurs (as discussed above), that information is written to the identification device at the time. In FIG. 1, the triangles 105, 106 represent some of many events that may be recorded within the active identification means.

5. In some instances, it may be preferable to log the information external to the identification means, simply using that as a unique identifier perhaps of the sire as well). For example, there may be too many monthly weight gain results to be included within the memory of the identification module.

6. If the animal goes to the meat works, a good deal of quality-related information may become available such as carcass weights, meat pH, marbling, and so on. Each carcass may be uniquely identified back to the farm of origin and it is now possible to correlate the meat works information with breeding information to aid in livestock selection. In the event of a withholding period being still current, the meat shall be rejected for markets for which it fails. (See later)

7. This information as to origin may be transferred to containers of the products obtained from the carcass so that even at the point of sale it is possible to determine the farm of origin and other information.

8. Other information may be stored and recalled from time to time, such as compliance with stock movement restrictions.

9. Preferably means are provided to return at least some of the information recovered from the identification module at the end of the life of an item bearing the identification module to the originator of the item, so that the originator is made aware of selected information optionally including extra information. In the case of an animal destined for a meat processing works the extra information includes information relating to carcass weight, meat quality, and the like that becomes available during the process of dismemberment and several meat works are starting to automate the gathering of information on a per-animal basis.

It can be seen that there are advantages in providing a set of security rights, each one either allowing or denying read access, and allowing or denying write access to any field of a record carried within an RF-ID tag and preferably these rights are allocated according to the kind of person who is operating the terminal at the time. Statutory controls over access may be required where certain national herd health programmes are in place, such as for the control of zoonoses or serious (notifiable) animal diseases by way of vaccination programmes. Properly controlled access is also important for example in relation to withholding periods for cows treated for mastitis (for example) where antibiotic inadvertently found in a tanker of milk can involve large financial penalties. Our protocol usually adds the identity of the operator to any written data.

TABLE 1 shows how security rights may be allocated, using keys, in relation to an animal record.

| Field Title | Wrt. Once | 1st Owner | Current Owner | MAF Rep. | Farm-hand | Veterinarian | Stock Agent |
|---|---|---|---|---|---|---|---|
| Tag ID | Y | RW | R | R | R | R | R |
| Animal ID | Y | RW | R | R | R | R | R |
| Sire ID | Y | RW | R | R | R | R | |
| Dam ID | Y | RW | R | R | R | R | |
| Birth Place (ID#) | Y | RW | R | R | R | R | |
| Birth Date | Y | RW | R | R | R | R | R |
| Tuberculosis Test Passed | | R | R | RW | R | R | R |
| EBR Vaccinated | | R | R | RW | R | RW | |
| Treatment Type | | R | R | R | R | RW | |
| Treatment Date | | R | R | R | R | RW | |
| Withholding Period | | R | R | R | R | RW | |
| Weaning Weight | | RW | RW | | RW | R | |
| Last Time Weighed Weight | | RW | RW | | RW | R | |
| Present Weight | | RW | RW | | RW | R | R |
| Merit (a selection index) | | RW | RW | | RW | R | |
| Health/Organic/GM status | | RW | RW | | RW | R | R |

"MAF Rep"; an official responsible for carrying out tests under a national scheme. A "Stock Agent" buys and sells animals. GM = "genetically modified". Many other individuals may have good reason to use tags and terminals according to this invention, and be given personal "key tags". The list of fields shown here is also purely illustrative and by no means complete.

Application 2—Packages

Example applications include packages handled by a postal service, by couriers, or by luggage handlers at airports. The present printed bar-code system is cheap, but requires optical contact between a label and a reader, and cannot be altered during transit An accompanying computer record of the package and its progress is assumed. There ought to be a world-wide standard for encoding desired information within the available memory structure, as previously described, so that, regardless of actual chips, the system is capable of universal application. In one example, a dispatch company may be reserved a unique identifier of 16 bits—used as bits 0–15 (write-once). Individual identifiers use up the next 24 bits (Write-once ). This gives a rollover of 1.6 million items, which may not be enough in some cases. Owners may be given a code or represented in plain text. Destination may be treated likewise.

Date of acceptance uses 12 bits (write-once). Some other snippets of information may be required to be write-once, such as weight, class of hazardous goods, priority or fragility. Other information, having less significance, may be on reusable parts of memory.

Whenever a significant event occurs (such as transhipment), that information may be written to the identification means at the time. Other information may be stored and recalled from time to time, such as Customs inspections. Optionally, externally stored information may be maintained, perhaps as a copy of information stored within the identification means, such as shipping information, so that a shipper can locate an item from within a database rather than by scanning over actual packages in many locations.

It can be seen that again there are advantages in providing a set of security rights, each one either allowing or denying read access, and allowing or denying write access to any field of a record carried within an RF-ID tag and preferably these rights are allocated according to the kind of person who is operating the terminal at the time. Statutory controls may be required where customs and excise matters are involved, or baggage inspection is done, or where the responsibility for setting a destination for an item of luggage should be attributable to an operator. Other facts, such as when an item of luggage passed a certain point are less important although they may be useful to indicate where (and when) an item was checked.

Communication Means and Interrogation Hardware

It should be pointed out that the invention as outlined in this specification is largely independent of actual operating frequencies or the like, and partially independent of particular RF-ID chip designs.

The physical manifestation of a "terminal" as the word is used herein may comprise a hand-held device, or may comprise a device affixed to a structure such as a cattle race, together with an enhanced antenna and possibly connection to an associated device such as electronic weighting scales or electrically operated feed dispensing devices capable of catering to an individual requirement, or for baggage, it may be fixed to a recognisable part of a conveyer system.

Programmable Terminal, Example 1

As a demonstration prototype we have constructed a hand-held unit, comprised of a modified reader compatible with at least one type of implantable RF-ID tags selected (operating at 128 kHz), physically and electrically coupled to a "Palm Pilot"™ hand-held computer acting as digital controller, data storage device, and human interface—by means of the liquid crystal display. We call it a "Programmer/reader", or (see the claims) a "Terminal". The Palm Pilot has been programmed in the language "C". Some novel procedures supporting the present invention will be described here. (Of course the reader will appreciate that this invention is in no way limited to any one brand of generasised device such as a "Palm Pilot". Our description may apply to a purpose-built device). An ideal device could be operated with just one hand, and would have a large internal memory such as 128 Mbytes. FIG. 7 shows a series of example screens.

Procedure when turned on. In addition to the usual start-up sequence (self-tests, memory checks, etc), the microprocessor of the programer/reader, while executing a program written in "C", assembler, or the like confers on itself a null security rank and attempts to load either (A) data from an implantable tag—limited to that data predetermined as being available to the lowest reading rank and then store or display that data accordingly, or (B) data—like a password—from a "key" (in practice, conveniently an implantable tag carried inside a non-conductive holder on an operator's key ring). Whenever it discerns password-like data, the microprocessor establishes the security rank associated with that class of password and confers on itself (perhaps for a limited period of time such as eight hours, one day, or until turned off) that security rank so that more, or less of the data stored in the memory can be read from, and possibly added to or written over, depending on previously determined rules and the inherent capabilities of the silicon chips carried within the tags. Preferably a user identification that is unique to the individual holding the key is combined with the password so that the individual—who may be one of many people having the same security rights—is identified as responsible for any data that may be put into storage.

In use, this means for example that the farmer who owns the animals, a farm worker, a veterinarian, and a livestock buyer, each possess an individual password within an implantable "key" tag conveniently carried on that person's key ring. (With a reasonable range, a more continuous refreshment of security rights can occur). The system assumes that it may use the powers conferred on the last person to "show" it a "key" tag. As a result, a final system may allow the veterinarian to identify the animal's vaccination history, and to over-write parts of the "recent treatments" part of the implantable tag memory, whereas the farmer may be able to read all of the memory and has the ability to add new material to nearly every part. A livestock buyer might only be able to establish identification, vaccination history, age, and previous owners. An artificial breeding technician could load the sire ID into the cow-s tag. Any user may also have the power to save copies of parts of the implantable tag data in controller memory for later downloading. Any altered or added entries within implantable tag memory can have the current password or a derivative attached—to provide the identity of the operator responsible for the information.

The need, if any, for data to be exported from the hand-held reader will vary with circumstances. One scenario may be that the farmer wishes to download a good deal of material from a programmer/reader into a personal computer, for example to record weight gains recorded by the farm worker, and then sort them as part of an animal selection process. Some farmers, who do not possess a personal computer, may be able to send the required data through a telephone modem to a bureau equipped to handle the information. Actual connection may for example be made with the programmer/reader through an optical link, a direct electrical connection, or by means of induction at the working frequency. It should be remembered that one advantage of this invention is that the data is carried within the implantable tag rather than in separate, remote storage systems.

Alternatively, the programmer/reader may itself be sufficiently easy to use as a data storage device that it resembles "a filing cabinet in the farmer's pocket" —for animal data at least.

The probability that the hand-held programmer/reader may at times be holding a number of days worth of irreplaceable information (megabytes of information) not as yet downloaded indicates that it is often desirable to place at least the memory store and support batteries within a physical internal "vault" or safe, capable of resisting a good deal of force such as from a hoofed animal running over it, if it had been dropped into a race by accident. Then, even if the rest of the reader has been destroyed, a repair facility can still recover the stored data.

Different models of programmer/reader may intrinsically have greater or lesser powers—such as more capacity in the memory, more privileges, more software functions, greater battery life, greater range (if that is desirable), a printer port, and so on. Possibly, different plug-in modules (perhaps resembling PCMCIA cards) which hold stored programs may allow different operations to be carried out with a given set of stored data. FIG. 7 shows a few examples of screen displays (for a touch-sensitive screen) which are self-explanatory.

Given that we propose that a terminal may, when first switched on, have no security status or level, and that multiple sources of terminals may occur, it is useful to encrypt the data stored within a tag so that no un-empowered terminal can read the data. One proposed encryption method is to scatter individual bits to be remembered throughout the memory plane or planes in a non-ordered manner so that only terminals "knowing" the format used are able to recover the data in a sensible manner. This proposal can allow redundancy through duplication, or through the use of checksums or Huffiann codes or the like, so as to protect against damage to individual bits of data Cosmic rays may be one source of damage to stored data.

Applications Programmable Interface (API)

The terminal may need to be used in conjunction with a range of other electrical equipment as described above. Given that in time many devices may require sophisticated control means such as that embodied in this terminal, we propose to publish the communications protocol and description of the available data fields so that software can be written to gain access to (a) the functions inherent in the terminal, and (b) via the terminal, data storage areas within RF-ID tags for which the terminal is adapted and for which a security level system is in place. In this way, it is possible for animals to traverse a race, be weighed, and have their weight data transferred into their RF-ID tags without human intervention. Here, a terminal may not be provided with human interface means such as a display and a keyboard (or the like). The actual interface protocol may be of the type known as RS-232, RS-422, or may involve an optical data link in order to better isolate the terminal from uncontrolled transients such as when an electric fence is in use somewhere on a farm.

Furthermore, the terminal may be used in conjunction with some other piece of equipment requiring control not involving the use of RF-ID tags, such as to read off details of faults within an irrigation machine, or an electric fence.

A further set of variations involves programmed reader/writers. A terminal may be modified, including connection to a computer local-area network or the like, for use in a meat works to for example sense the position of components so that the status of any part of the process can be ascertained. For use in a weighing station for animals, a terminal device may be attached to a set of electronic scales so that the new weight is automatically and without error copied into the RF-ID tag. For use in a situation where animal feeds or supplements are dispensed, a terminal may be attached to a feed metering device so that each animal receives only that amount considered appropriate for that animal, of the feed or supplement.

In order to protect against inadvertently trying to read two tags at the same time if more than one is within range, anticollision software (as is known in the art) is proposed.

If one can assume that a farmer is likely to have the terminal device in his possession at most times, it may be useful to put information such as drench treatment data (methods, batch number, etc) into an RF-ID tag incorporated in the drench label Some of that data could be passed automatically into the tag of each animal treated, so that batch numbers of any drugs used are carried with the animal.

Transponder Example 1

Figure 3:
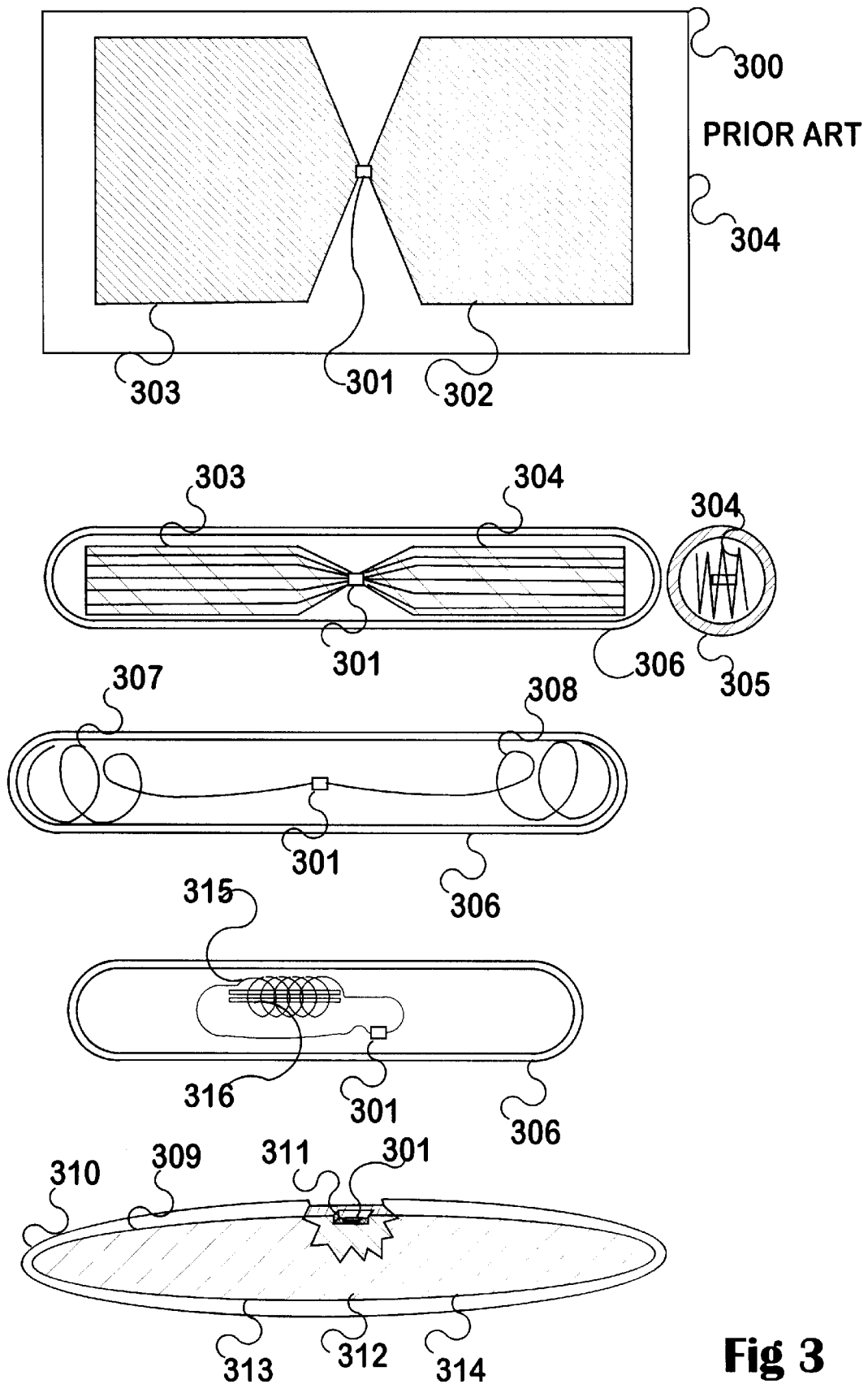
FIG. 3: Some proposed implantable devices.

An initial "proof of concept" for this invention was to employ the "Motorola" BISTATIX(R) technology. A bare silicon chip is attached to a conductive substrate that forms an electrostatically coupled aerial. This active device includes receiver means, internal power supply means, storage means, and transmitter means. A prototype aerial intended for use on packages or the like is in the shape of butterfly wings of printed, conductive ink having an overall area of 80×45 mm, with the chip glued in the correct orientation at a position between each of the wings—corresponding to a butterfly's body. FIG. 3 shows this at 300; with the chip 301 connected and attached across two conductive areas 302, 303 upon a substrate 304. At the time of writing, no technical information has been made available by Motorola other than the operating frequency and the existence of an approximately 900 bit memory space. The preferred transmission frequency to send information to, and provide operating power for the chip is 125 kHz, so clearly the aerial size simply provides a symmetrical area capable of intercepting part of an electrostatic field. Larger wings provide a greater range. The collected energy needs to provide enough electricity to power the chip as well as send signals to it, and the transceiver 400 should include means to detect information from the chip. Conveniently, the chip responds at half the frequency—62.5 kHz locked to the transmission frequency. Transmission protocols include a powering-up period and then one or more information words according to a built-in protocol, capable of selecting read or write, address, and data to be stored.

Figure 4:
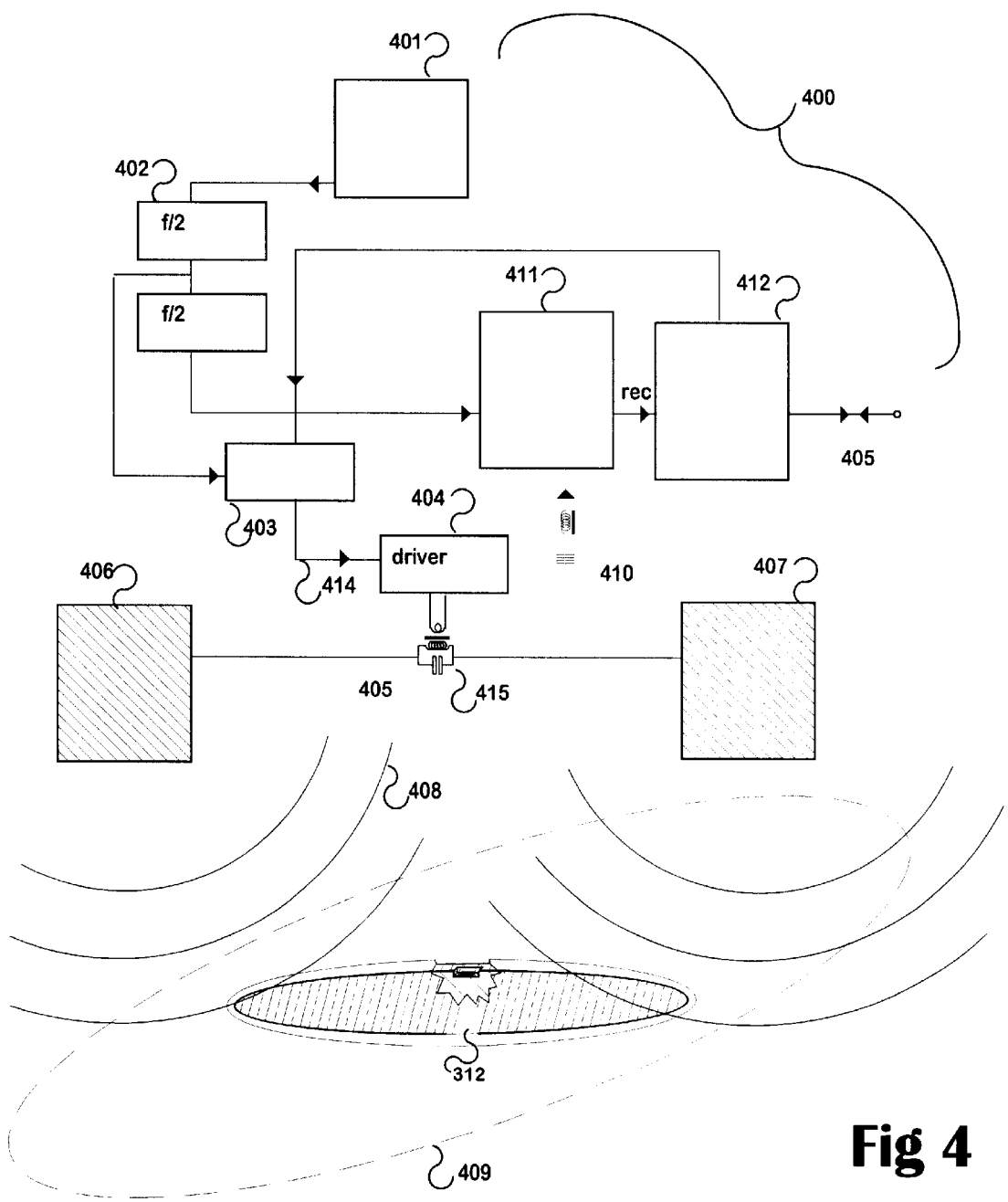
FIG. 4: Outline of a transceiver according to the invention.

An example transceiver is shown as a block diagram in FIG. 4. Here, an oscillator 401 develops a working frequency which is divided (402) to make 125 and 62.5 kHz clocks. For transmission to the chip, this signal may be phase-modulated (403) and the resulting transmission signal 414 is passed to a driver 404. A resonant step-up transformer 415 develops a voltage at 125 kHz on the plates 406 and 407, which produce an alternating electrostatic gradient 408. Reception may use the same plates as sensors, coupled to a phase-sensitive detector 411 through a 125 kHz trap. This type of detector minirmises the effect of random noise. The detector output is passed through an interface 412 through link 405 to a data processor section of a terminal. In this illustration the implant 312 is shown inside an "ear" 409.

For construction of an implantable object, capable of being inserted into and remaining within an animal, where a known acceptable container is a short, sealed, glass tube 306, a chip 301 of this type may be centered within the length of the tube. A paper or plastic substrate printed aerial may be folded (pleated, rather than rolled) to fit within the tube. A short wire (307, 308) may be connected from the chip to each end. A conductive packing such as aluminised silica gel or some other material acceptable to end users may be placed at each end, separated by an uncoated section about the chip. Wire provides a more positive connection. Internal aluminising within the glass tube, in combination with a spring to retain the chip, is another possibility.

Another cheaper form of implant may comprise for example a lozenge-shaped solid object 309 perhaps made of a plastics material by means of an injection moulding technique. The lozenge has a conductive coating 313, 314 (indicated by shading) over each end, separated at the middle by a small gap 312 including a recess 311 capable of accommodating the chip 301. After the chip is glued in place preferably with a conductive glue the entire lozenge is dipped in a biologically inert insulating and protective coating 310. This article may be longer than shown in the drawing in FIG. 3, to enhance its ability to collect an alternating electrostatic field gradient Optionally the biologically inert coating or one layer of it may include an ingredient capable of suppressing any local infection resulting from the act of insertion of the identification means. This may be a small amount of an antibiotic, capable of being leached out and of disappearing from the systemic circulation within a short period, or it may be a disinfectant material such as an iodine-based compound (an iodophor) or a disinfectant dyestuff such as "Crystal Violet". (The implications of using a biologically active material in terms of Animal Remedies laws may make it preferable to avoid this approach). We tend to prefer plastic over glass, because we have had about a 1% breakage rate in our trials with beef cattle in rough country.

A preferred location is subcutaneous and in the back of one ear of an animal, because this is a defined area, already widely used for implantation of slow-release pharmaceuticals, and the ear is not intended for consumption (except in the case of pigs). The U.S Food and Drug Administration has preferred this site. If for example the left ear is always used, a reader will take less time to find the implant. Other possible animal tag internal locations include: caudal fold, hock, rumen (inside a heavy "bullet") and intraperitoneal sites, although none are as suitable as the ear: considering ease of access and food hygiene aspects.

In an "external tag" version such as for livestock, the identification means is provided within a non-implanted attachable object such as one of the well-known cattle eartags, typically at least 50×50 mm in size capable of being attached to an item to be identified; the object also being capable of information interchange as a result of interaction with an electromagnetic field. Visual identification attributes such as a large, easy-to-read number confer a dual purpose on this version of the invention. The invention may be simply a sandwich of plastic including within its structure a "Bistatix" chip and a symmetrical capacitative, conductive aerial having two wings (as per 302, 303) laid down on one layer, and covered with the other layer. Clearly, suitable construction techniques should be used to avoid for example overheating the chip. Wire mesh provides one form of aerial; a printed conductive ink is another.

Transponder Example 2

The currently preferred device is a Texas Instruments "Tag-it"™ chip and assembly, manufactured together with a pickup (160 kHz) and return (80 kHz) aerial coil and encapsulated within glass. Thus the capsule is inert and easily sterilisable, preferably with a liquid disinfectant that can also be used with the injection device. The chip includes means to employ some of the received energy as internal power. The chip also includes memory; currently 1.2 Kbits which is organised to be partly "permanent" or write-once memory and partly memory capable of being written to on a number of occasions. Furthermore, software protection provides that different levels of user's priority allow access to more or less of the memory. The current memory size is rather small and encryption and compression are used, with the terminal translating between human-readable information and the stored version. Nevertheless, the stored data can include the last ten veterinary treatments. A 4K bit memory version is likely to be available soon, and yet larger memories may be feasible. One part of the memory is preferably reserved for a unique identifier (which may include a country code). With the current type of terminal, it takes about 0.3 seconds to read an entire 1.2 K bit memory.

Other kinds of RF-ID devices which are suitable for use within this application will no doubt become available during the term of this invention.

Another example embodiment of the invention is a package tag not unlike 300 in FIG. 3, having means for attachment to an appropriate part of an item, a surface capable of bearing indicia, and an optionally internal surface capable of supporting the identification means and aerial means. This may be glued onto an ear of an animal for short-term use, with a cyanoacrylate glue for example.

In a first trial with about 150 beef animals, we had a few physically lost tags but no data was lost or corrupted during a number of reading or writing operations with any of the remaining tags. Steps to remedy the losses of tags are being taken.

Meat Industry

For use in a meat works, where the requirement is to label each cut of meat from a particular tagged animal, the invention may provide a number of options for creating a cloned group of labels—perhaps not including all of the original information. Here are some examples:
(2) (1) similar RF-ID tags—perhaps constructed on a creditward sized plastic sheet, or within an easily visible peg, and each of which may have information copied into it from the original RF-ID tag by a modified-terminal.
(3) Simply printed (in plain language) information on cards. (This has the particular advantage that no conversion at the time of sale into information that a customer can understand, is required). As an alternative, cards could bear a uniquely printed bar-code, perhaps a two-dimensional bar-code, if the amount of information to be retained exceeds a printed page.
(4) Cards having magnetic strips bearing the information to be kept.

INDUSTRIAL APPLICABILITY

Commercial benefits may be expected from livestock improvement and other forms of information feedback from a meat works to a farmer, accurate animal or item identification, quality assurance—in terms of assured linkage of information with a specific item, so that for example meat offered for sale can be linked to a farm of origin and a date of birth, hence allowing premium prices to be charged such as according to "organically grown" markets.

In large (300 plus) dairy herds, automatic warnings that a cow is still in the withholding stage after treatment for mastitis with antibiotics will help to avoid contaminated milk from being added to a milk tanker with consequent rejection of the entire load. It is not easy for the milking staff to remember which cow(s) are to be held back. Advantages of the invention over other forms of livestock identification include:

The animal identifier is at least partly modifiable and so serves as a physically linked logbook of that animal's background, the proposed system has a higher retention rate than external eartags, the associated paper trail is reduced because almost all of the information is held at or within the item, the system is cheaper than other forms of RF-ID system described for animals.

Finally, it will be understood that the scope of this invention as described and/or illustrated within this specification is not limited to the preferred embodiments described herein, and includes all other versions or variations of the invention that may be apparent to a reader skilled in the art. The scope is as set forth in the following claims.

What is claimed is:

1. For an active labeling system employing wireless-powered identification tags, a terminal including: data processing means, program control means, data storage means and optionally a display and user control means; the terminal having wireless communication means capable of reading from of writing to a wireless-powered identification tag; and the identification tag including tag data storage means capable of storing more than one field of data within a record, characterised in that the terminal is capable of
   a) acquiring data comprising a code sequence from an unprotected key area of data storage within a wireless-powered identification tag, and
   b) if at least a part of the code sequence is recognised by the terminal as belonging to a set of predetermined security key sequences, then adopting a security rank selected in accordance with the key sequence from a range of predetermined security ranks; the adopted security rank empowering the terminal to become capable of effective access to a predetermined set of one or more protected tag fields of data within the wireless-powered identification tag, so that the same terminal may serve different users at different times under different security ranks.

2. A terminal as claimed in claim 1 characterised in that at least one security rank permits only read access to a predetermined set of one or more protected fields of data within the identification tag.

3. A terminal as claimed in claim 1 characterised in that at least one security rank permits only write access to a predetermined set of one or more protected fields of data within the identification tag.

4. A terminal as claimed in claim 3, characterized in that the encryption means includes a process for placing the data within the tag data storage means in a non-predictable manner.

5. A key for providing a security rank to a terminal as claimed in claim 1, characterised in that the key area comprises tag data storage means capable of holding a fixed set of data including a predetermined security key sequence in a field always readable by the portable terminal, so that the security rank of the terminal may be altered at any time.

6. A key as claimed in claim 5, characterised in that the key area further holds a computed code sequence capable of uniquely identifying the identification tag.

7. A terminal as claimed in claim 1, characterised in that the terminal is programmed to retain a security rank, once adopted, for a limited maximum period.

8. A terminal as claimed in claim 1, characterised in that the terminal is provided with means capable from time to time of encrypting the data to be deposited within the tag data storage means, and with means capable of decrypting previously encrypted data retrieved from the tag data storage means, so that at least some fields of data stored within the identification tag are relatively inaccessible to terminals lacking an effective decryption means.

9. A protocol for operation of a terminal as claimed in claim 1 in relation to a wireless-powered identification tag, characterised in that the or each security rank after being loaded from the key is capable of specifying, in functional combination with instructions within the terminal, which of the one or more fields stored within the data terminal may be accessed in either a read mode or a write mode over a subsequent specified period, so that any one security rank permits access to a predetermined set of one or more fields.

10. A terminal as claimed in claim 1, characterised in that the terminal is further provided with interface means capable of facilitating the movement of data to or from at least one information-handling device according to an Applications Programming Interface so that the terminal can send and/or receive data between the terminal and the device and thereby effectively interact with the device.

11. A protocol for use of a terminal as claimed in claim 1, characterised in that the protocol enables an item having an attached identification tag to serve as its own data carrier; the protocol including allocation of one or more fields of data, each field having (a) a predetermined data type, (b) a predetermined ability to be read or concealed as determined by a currently active security rank previously read into the terminal from the key area, and (c) a predetermined capacity to be alterable, as determined by the given security rank.

12. A protocol for operation of a terminal as claimed in claim 11, characterised in that the protocol is developed for use with an animal.

13. A protocol for operation of a terminal as claimed in claim 12, characterised in that the protocol provides for the storage of a record of information including one or more of the following fields:

a) identification of the wireless-powered identification tag itself, b) identification of the animal, c) the date of birth of the animal, d) identification of the sire and/or the dam of the animal, e) the birthplace of the animal, f) the original owner of the animal, g) the current owner of the animal, h) the health status of the animal, i) any disease control measures imposed upon the animal, j) any treatments delivered to the animal, k) any withholding periods as a result of any treatments that are liable to result in unacceptable residues being present within the body of the animal during the withholding periods l) performance factors such as fertility, weight gains during known periods, wool growth, or stamina.

14. An active labeling system, comprising:

wireless-powered identification tags;

a terminal including data processing means, program control means, data storage means, and a display and user control means, the terminal having wireless communication means capable of reading from and of writing to the wireless-powered identification tags, the identification tags including tag data storage means capable of storing more than one field of data within a record, the terminal being capable of acquiring data comprising a code sequence from an unprotected key area of data storage within the identification tag, and upon recognizing the code sequence as belonging to a set of predetermined security key sequences, adopting a security rank selected in accordance with the key sequence from a range of predetermined security ranks, the adopted security rank empowering the terminal to become capable of effective access to a predetermined set of one or more protected tag fields of data within the wireless-powered identification tag, so that the same terminal may serve different users at different times under different security ranks.

* * * * *